US008613476B2

(12) United States Patent
Dominguez et al.

(10) Patent No.: US 8,613,476 B2
(45) Date of Patent: Dec. 24, 2013

(54) DEVICE FOR INSERTING INTO AN OPENING OF A COMPONENT OF AN AUTOMOBILE

(75) Inventors: David Dominguez, Meine (DE); Albert Pares Isanta, Llerona (ES)

(73) Assignee: Illinois Tool Works Inc., Glenview, IL (US)

( * ) Notice: Subject to any disclaimer, the term of this patent is extended or adjusted under 35 U.S.C. 154(b) by 22 days.

(21) Appl. No.: 13/380,600

(22) PCT Filed: Mar. 26, 2010

(86) PCT No.: PCT/EP2010/001899
§ 371 (c)(1),
(2), (4) Date: Dec. 23, 2011

(87) PCT Pub. No.: WO2010/149237
PCT Pub. Date: Dec. 29, 2010

(65) Prior Publication Data
US 2012/0097337 A1    Apr. 26, 2012

(30) Foreign Application Priority Data

Jun. 24, 2009   (DE) .......................... 10 2009 030 920
Nov. 27, 2009   (DE) .......................... 10 2009 057 750

(51) Int. Cl.
*B65D 53/00*    (2006.01)
(52) U.S. Cl.
USPC .................. 296/1.06; 220/795; 220/DIG. 17; 220/DIG. 19
(58) Field of Classification Search
USPC .................. 296/1.06; 220/780, 795, DIG. 17, 220/DIG. 19
See application file for complete search history.

(56) References Cited

U.S. PATENT DOCUMENTS

| 4,363,420 | A  | 12/1982 | Andrews |
| 4,588,105 | A  | 5/1986  | Schmitz et al. |
| 7,108,269 | B2 | 9/2006  | Benkel et al. |

(Continued)

FOREIGN PATENT DOCUMENTS

| DE | 10148493 B4   | 12/2004 |
| DE | 102006007914 A1 | 8/2007 |

OTHER PUBLICATIONS

ISR for PCT/EP2010/001899 dated May 26, 2010.

*Primary Examiner* — Dennis Pedder
(74) *Attorney, Agent, or Firm* — Lowe Hauptman & Ham, LLP

(57) ABSTRACT

Device for inserting into an opening of a component of an automobile, comprising a shaft body and a surrounding flange provided on one end of the shaft body, and at least one fastening element provided on the shaft body, wherein the device is insertable into the opening in axial direction of the shaft body such that the shaft body extends through the opening and the flange abuts on a first component surface and the device is fastened to the opening by the fastening element wherein an annular surrounding hollow space is delimited between at least a surface of the shaft body, an interior surface of the flange and the first component surface, further comprising a hot melt adhesive material provided surroundingly on the flange, which hot melt adhesive material adheres sealingly on the first component surface upon heating the flange, characterized in that the hot melt adhesive material is an expanding hot melt adhesive material, which compensates for a pressure change in the hollow space caused by changing temperature through a partial expansion into the hollow space.

21 Claims, 3 Drawing Sheets

(56) References Cited

U.S. PATENT DOCUMENTS

Figure 1:
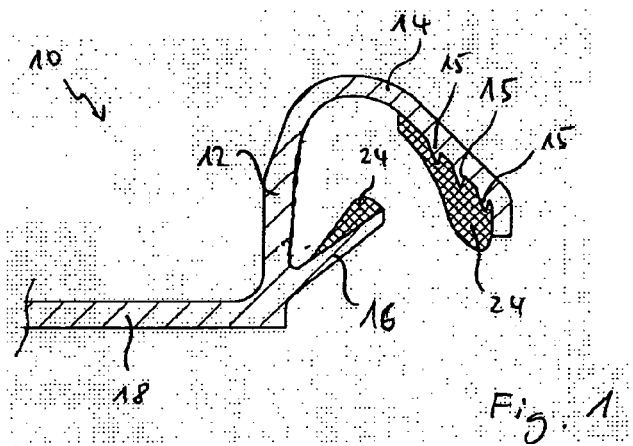

| | | |
|---|---|---|
| 7,802,955 B2 | 9/2010 | Jatzke |
| 8,070,008 B2 | 12/2011 | Janke |
| 2005/0121942 A1* | 6/2005 | Repp et al. ............... 296/146.15 |

* cited by examiner

DEVICE FOR INSERTING INTO AN OPENING OF A COMPONENT OF AN AUTOMOBILE

RELATED APPLICATIONS

The present application is national phase of PCT/EP2010/001899 filed Mar. 26, 2010, and claims priority from German Application No. 10 2009 030 920.9 filed Jun. 24, 2009, and German Application No. 10 2009 057 750.5 filed Nov. 27, 2009.

The invention relates to a device for inserting into an opening of a component of an automobile, comprising a shaft body and a surrounding flange provided on one end of the shaft body, and at least one fastening element on the shaft body, wherein the device is insertable into the opening in the axial direction of the shaft body such that the shaft body extends through the opening and the flange abuts on a first component surface and the device is fastened to the opening by the fastening element, wherein an annular surrounding hollow space is delimited between at least a surface of the shaft body, an interior surface of the flange and the first component surface, further comprising a hot melt adhesive material provided surroundingly on the flange that upon heating adheres the flange sealingly on the first component surface.

Auto bodies or body parts of automobiles, for example, are dipped into suitable baths for treating and painting. So that the fluid can penetrate into hollow spaces and flow out again from them, openings are provided in the auto body sheets. Predominantly, for corrosion protection reasons, it is necessary subsequently to seal these openings. For sealing such openings, sealing plugs are known which are customarily composed of plastic and installed manually by simply pressing into the opening. Such sealing plugs have at least one flange which lies against one side of the auto body sheet, and fastening means which engage behind the other side of the sheet and thus, fasten the device. A sealing plug is disclosed, for example, in the patent DE 101 48 493 B4.

In order to prevent air and/or water from penetrating, sealing means, for example hot melt means, are provided between the flange and the sheet. For mounting, such sealing plugs are installed into the opening, for example, of a freshly painted body part, and the body part is subsequently introduced into an oven for curing the paint. The sealing plug is heated with the body part, and the hot melt adhesive melts and thus, provides a sealed adhesion of the plug at the opening. Here, in the inserted state of the device in the opening, the interior surfaces of the sealing plug including possible seals and the sheet delimit a hollow space, that is sealingly closed by the hot melt. The volume of the hollow space is predefined by the geometry of the plug. If an auto body part provided with such a sealing plug is removed from the oven after curing the paint, the gas enclosed in the hollow space cools again with the auto body part. In the process, the gas in the hollow space can cool more slowly than the air surrounding the device. Due to temperature change in the hollow space, the pressure in the hollow space is also reduced. A low pressure arises which can lead to the formation of bubbles or channels in the area of the still pliant sealing material through which air can be drawn into the hollow space. As a result, the sealing effect can be impaired such that subsequently air and/or water penetrate into the hollow space, and can lead to corrosion problems.

For solving this problem, in DE 10 2006 007 914 B4 a pressure compensation chamber is provided that is connected to the hollow space, and compensates the temperature dependent pressure change within the hollow space by changing the volume of the pressure compensation chamber. In particular, during cooling of the plug, gas from the pressure compensation chamber arrives in the hollow space and thus, compensates the pressure change. However, this solution is structurally relatively complex, and thus, very costly.

Starting from the described state of the art, the object of the invention is to provide a device of the initially named type with which a reliable sealing, and with it a more dependable corrosion protection, is achieved in a manner that is constructively simpler, and thus, more cost-effective.

This object is achieved according to the invention by the subject matter of claim 1. Advantageous embodiments are found in the dependent claims, the description and the drawings.

For a device of the initially named type, the invention achieves this object in that the hot melt adhesive material is an expanding hot melt adhesive material, which compensates a pressure change in the hollow space due to changing temperature by a partial expansion into the hollow space. The hot melt adhesive used according to the invention is therefore, a combined adhesive and expansion material that has both an adhesive effect, and expands during heating. This expanding hot melt adhesive is applied, in particular, on an inner surface of the flange, which is facing the component surface delimiting the opening, e.g. the sheet top surface. The hollow space is sealed leak-proof with respect to the surrounding, and its volume is predetermined by the geometry of the device and the component. The invention is based on the recognition that with the use of an expanding hot melt adhesive, a pressure change due to the cooling of the gas contained in the hollow space can be compensated by the penetration at this time of the still flowable hot melt adhesive expanding into the hollow space. In particular, the hot melt adhesive takes up specifically such a volume of, for example, the hollow cavity cooling after heating for curing of vehicle paint, such that in the cooled hollow space again the same pressure prevails as in the surroundings of the device. This procedure occurs automatically due to the self actuating compensation of the pressure in the hollow space to the ambient pressure. A breakdown of the seal provided by the hot melt adhesive due to the pressure change, and with it, the danger of corrosion in the area of the opening closed in the hollow space are reliably prevented according to the invention. At the same time, a constructively complex pressure compensation chamber is not necessary. Furthermore, due to the expansion activity of the hot melt adhesive material and the relatively high material density, the device according to the invention is less sensitive with respect to the insertion position. An undesired runoff of the material, and with it an adverse effect on the seal are reliably avoided.

The component can be a flat component, such as a sheet, for example an auto body sheet. The opening can correspondingly be an auto body opening, as is used for the inflow and run-off of fluids in dipping baths for the auto body sheets. The surfaces delimiting the opening can correspondingly be the top and bottom surfaces of the sheet. It is pointed out that, actually, the annular hollow space need not be circular ring shaped. Moreover, it can have an oval or other shape. It is essential only that the hollow space is closed and is formed surrounding.

According to one design, the hot melt adhesive material can be applied at the flange in the axial direction of the shaft body so that with the device inserted into the opening and in the non-expanded state of the hot melt adhesive material, the flange abuts on the first component surface. Furthermore, it can be provided that the hot melt adhesive material is not visible from the outside of the flange in the axial direction of the shaft body, and that upon heating it expands underneath the rim of the flange radially outward so that after expanding is visible from the outside of the flange in the axial direction of the shaft body. With heating, the hot melt adhesive expands, and with this design, emerges ring-shaped from under the flange. This is easily achieved specifically with the use of expanding hot melt adhesives. Thereby, on the one hand, a sealing effect in the area of the contact between the flange and the component surface, and with it the corrosion protection, are improved. And, on the other hand, the successful and complete seal can be seen in a simple manner by visual inspection of the flange top surface. If the hot melt adhesive has emerged uniformly, ring-shaped from under the entire periphery of the flange, it is ensured that a proper seal is present. In contrast, with the state of the art, there often exists a problem that hot melt adhesive material expanded non-uniformly and only in sections, however at places in increased amount, which gives rise to the impression of a leakage, or an insufficient seal, even though a proper seal may actually be present.

According to a further design the at least one fastening element can be at least one locking projection disposed on the outside of the shaft body, where said locking projection locks on a second component surface opposite the first component surface when the device is inserted into the opening. In particular, a plurality of such locking projections can be provided which engage on the bottom surface of the component. Thus, the device according to one design can, in particular, be a so-called grommet, that is, a component with which one component can be connected to another component through the opening, for example, by a screwed connection through the grommet. Here, the grommet can have a passage for a further component.

According to a further design, it can be provided that the device is a sealing plug for sealingly closing the opening comprising a closed cover, connected with the shaft body, for closing the opening that the fastening element is formed by a second surrounding flange being provided on the shaft body opposite the first flange, where said second flange, when the device is inserted into the opening, abuts on a second component surface being opposite to the first component surface so that the annular surrounding hollow space is delimited between a surface of the shaft body, interior surfaces of the first and second flange and the first and second component surfaces, and that a hot melt adhesive material is provided surrounding also on the second flange which upon heating adheres the second flange sealingly on the first component surface.

Thus, according to this design the device is a sealing plug for sealing the opening. It has two flanges, in particular, lips, which clamp the sheet from above and below, and seal completely circumferentially, in each case. In the mounted state, the covering spans the opening, and this securely seals it in cooperation with the two flanges. Because the second flange also has a hot melt adhesive, this flange is also adhered sealingly to the second component surface. Thus, the seal effect is improved, and the function of the device and corrosion protection is further secured. In the process, the expanding hot melt adhesive material applied to the second flange can also compensate a pressure change in the hollow space due to changing temperature by a partial expansion into the hollow space. Then, the pressure compensation in the hollow space arises from both flanges. The compensation occurs faster and more reliably, wherein at one flange sufficient expansion material for only part of a hollow space must be provided.

In order to guarantee a sufficient pressure compensation even, for example, with large temperature changes occurring with paint curing of auto body sheets in ovens, sufficient expanding hot melt adhesive material must be provided at the flange(s), and this material must expand sufficiently strongly. Therefore, depending on the external parameters, in particular, the temperature, the material can have an expansion factor, that is, an increase in volume, of at least 10%, preferably more than 15%. Such an increase in volume can occur, for example, with a temperature of 100° C. A possible material for the hot melt adhesive is e.g., expanding ethylene vinyl acetate (EVA). However, other expanding materials can also be considered such as expanding polymers, etc.

According to a further design, the first and/or the second flange can be resiliently elastic at least in the axial direction of the shaft body. Furthermore, the first and/or second flange, when the device is inserted into the opening, can curve, starting from the shaft body, in the direction of the component surface respectively assigned to them. This improves the pressing forces of the lip-shaped flanges at the component, and with it the seal of the opening. With the pressure compensation according to the invention by means of the expansion material, there exist no concerns in this case to form the hollow space of significant size by a corresponding curve of the flange, and thus, to further optimize the pressing forces.

According to an alternative design, the expanding hot melt adhesive material is mechanically connected to the first and/or second flange. A mechanical connection can occur, for example, using a catch mechanism.

Furthermore, the device can be composed of a plastic, and in particular, can be produced in a simple and cost-effective production manner with an injection moulding process. Furthermore, in a two component injection moulding process the expanding hot melt adhesive material can be moulded onto the first and or second flange.

According to a further embodiment, the first flange and/or the fastening element or the second flange can have a through hole. Such a through hole or such a hole is disposed, in particular, in a surface of the first flange, and/or the fastening component or of the second flange, which or whose inside, is provided with an expanding hot melt adhesive material before mounting the device. This way, before mounting, it can be visually recognized from the outside of the device in a simple and reliable manner whether the hot melt adhesive material was correctly applied, for instance, moulded onto the respective surface. Here, it was recognized according to the invention that in practice, the hot melt adhesive material was correctly and uniformly applied or moulded onto the entire desired surface, when the hole is closed by the hot melt adhesive material. In contrast, if after the application of the hot melt adhesive material, a part of the through hole remains open, a faulty application of the hot melt adhesive material exits.

At the same time, the through hole provides an indication whether the device was correctly mounted sealingly in the component. In particular, the through hole shows whether the hot melt adhesive material, expanding in the course of mounting and heating, correctly seals the ring-shaped surrounding hollow space, and with it, the component opening even after the cooling process. In the course of the cooling process, a failure of the seal can result if the expanding hot melt adhesive material does not sufficiently compensate for pressure changes in the hollow space occurring in the course of the cooling by a partial expansion into the hollow space. In this case, air from outside is sucked into the ring shaped hollow space, and the seal of the component opening is broken in an impermissible manner. Here, according to the invention, it was recognized that if such a suction of the air results, it occurs through the through hole of the first flange and/or the fasting element or the second flange that was closed by the hot melt adhesive material before mounting. In this respect, the through hole closed by the hot melt adhesive material represents the weakest link of the device, which compensates the pressure difference between the hollow space and the surroundings by producing a connection between the hollow space and the surroundings through the through hole. This failure of the sealing effect must be visually checked in a simple and reliable manner after the mounting of the device and again after cooling of the hot melt adhesive material.

In principle, the through hole can have any arbitrary cross sectional shape. For example, it can have a circular cross section. According to a further design, the through hole can have an oval cross section. It has been shown that failure detection occurs particularly reliably in the case of an oval cross section. Thus, a faulty application exists even if the oval-shaped through hole is filled with hot melt adhesive material with a circular cross section.

The invention also relates to a device according to the invention in the inserted state, in particular, in the expanded state of the hot melt adhesive, in the opening of a component of an automobile, in particular, of a metal sheet of an automobile. The sheet can be, for example, an auto body sheet. Further, the invention relates to a use of the device according to the invention for insertion in an opening of the component of the automobile or for closing the opening, in which the device in the inserted state in the opening is heated so that expanding hot melt adhesive material expands in the manner according to the invention, and the flange(s) is adhered sealingly to the first or the second component surface.

Figure 2:
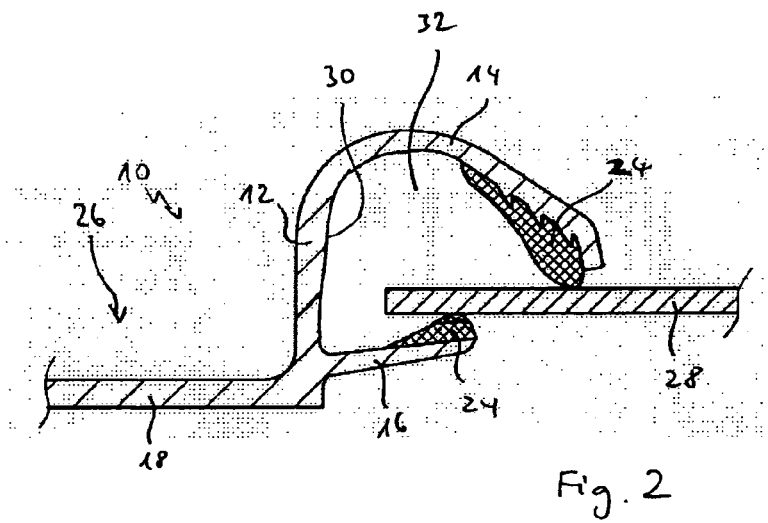
Figure 3:
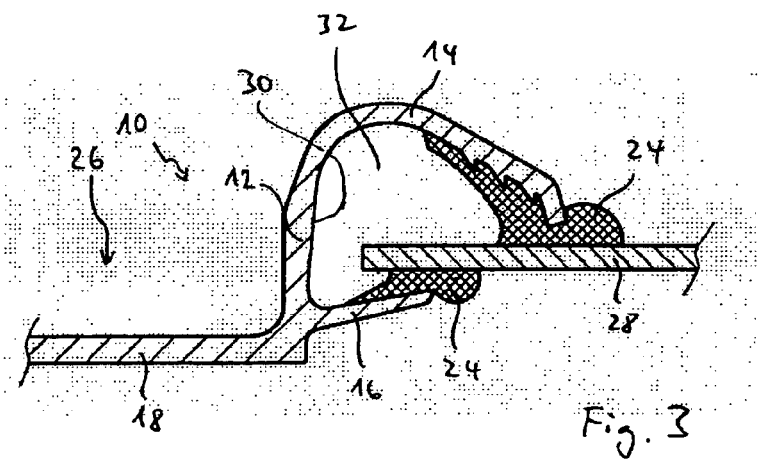
Figure 4:
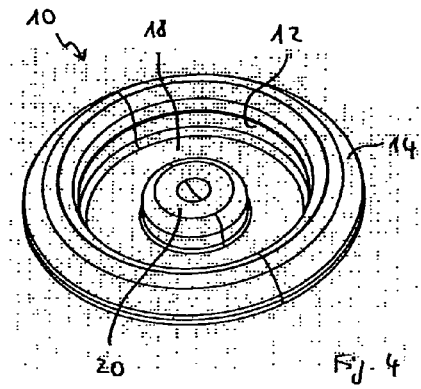
Figure 5:
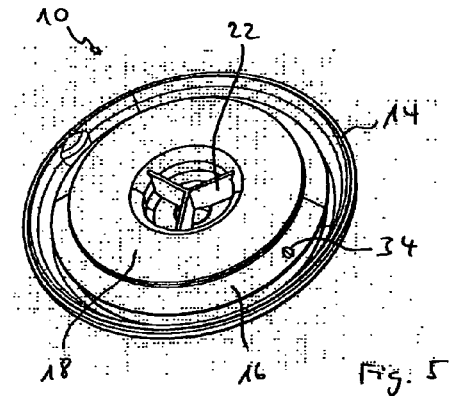
Figure 6:
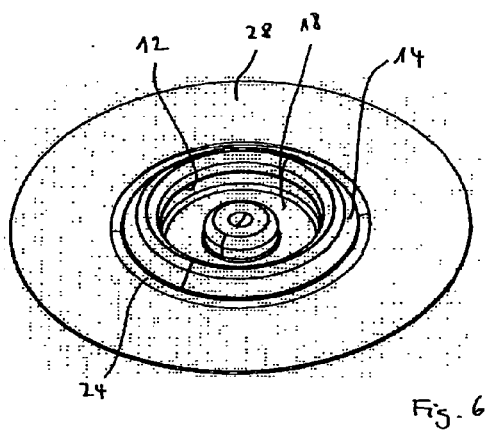
Figure 7:
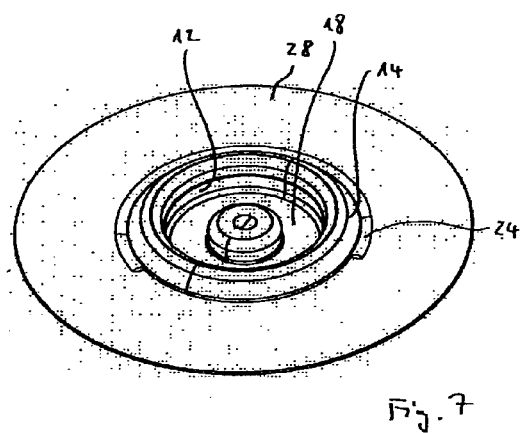
Figure 8:
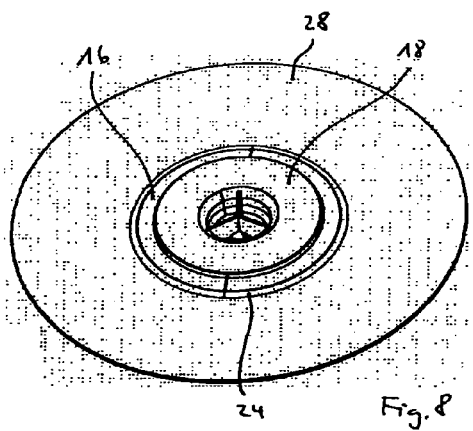
Figure 9:
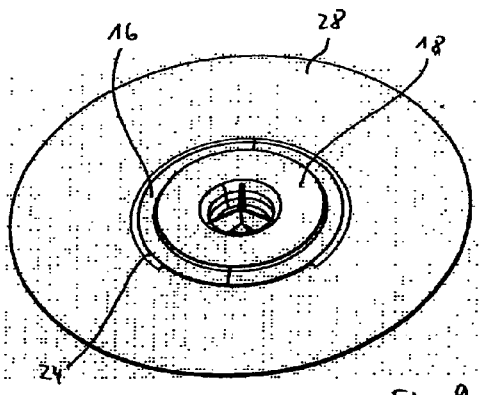
Figure 10:
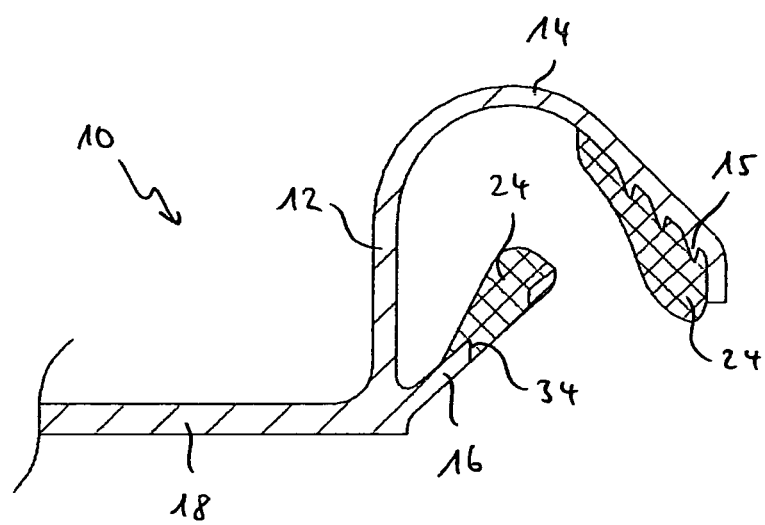

An exemplary embodiment of the invention is explained in the following in more detail using the drawings. They show schematically:

FIG. 1 a partial cross section of a device according to the invention in the un-mounted state, FIG. 2 the partial cross section shown in FIG. 1 in a first operating state, FIG. 3 the partial cross section shown in FIGS. 1 and 2 in a second operating state, FIG. 4 a perspective view of the top of the device according to the invention, FIG. 5 a perspective view of the bottom of the device according to the invention, FIG. 6 the device according to the invention in the mounted state in a perspective view of the top, FIG. 7 the representation from FIG. 6 in a partial sectioned view, FIG. 8 the device according to the invention in the mounted state in a perspective view of the bottom, FIG. 9 the representation from FIG. 8 in a partial sectioned view, and FIG. 10 a further partial cross section of a device according to the invention in the un-mounted state.

Unless otherwise specified, in the figures the same reference numbers designate the same objects. FIG. 1 shows in cross section a part of the device 10 according to the invention, which in the represented example is a sealing plug 10 for insertion in an opening of an auto body sheet of an automobile, not shown. The rotationally symmetric device has a cylindrical circumferential shaft body 12, and an also circumferential lip-shaped first flange 14 integrally connected to this at the upper end of the shaft 12. The flange 14 curves starting from the upper end of the shaft body 12 downwards, and is resiliently elastic in the axial direction of the shaft body. In the area of the lower end of the shaft body 12, a second lip-shaped flange 16 is also integrally connected with the shaft body 12, which in the un-mounted state of the device 10 shown in FIG. 1, extends obliquely upwards starting from the shaft body 12. This flange 16 is also resiliently elastic in the axial direction of the shaft 12. In addition, the device 10 has integrally connecting at the bottom side of the cylindrical shaft 12 a closed, pot-like cover 18, which in the top view is formed ring-shaped, and integrally gives way to a central hollow cylinder elevation 20, as can be seen in FIG. 4. In the view of the device 10 from the bottom shown in FIG. 5, it can be seen that in the cylindrical elevation 20, three reinforcing ribs 22 are disposed offset from each other at an angle of 120°. Both flanges 14, 16 are provided in their radial outer area at their respective interior surfaces with a ring shaped, surrounding, expanding hot melt adhesive material 24. At the inside of the first flange 14, several jagged-shaped projections 15 are formed also ring-shaped, circumferential, and which improve the adhesion of the hot melt adhesive material. It can be seen that the hot melt adhesive material is formed on both flanges 14, 16 projecting in the axial direction of the shaft body.

In the example shown, the device 10 was produced from plastic using an injection moulding process. The hot melt adhesive material 24 was then injected on the device 10 also in an injection moulding process, and particularly, a two component injection moulding process.

In FIG. 2, the device 10 is shown in the inserted state in a circular shaped opening 26 of an auto body sheet 28. In FIG. 2, the state prior to heating the hot melt adhesive material 24 is shown. The device 10 is pressed by hand in the axial direction of the shaft body 12, downwards in the representation in FIG. 2, into the opening 26 of the auto body sheet 28. In the process, the lower flange 16 is initially pressed in the direction of the shaft body 12, and after entering the opening 26 moves outwards again, away from the shaft body 12, and locks on the bottom of the sheet, as shown in FIG. 2. As can be seen in FIG. 2, in this state, both the first and the second flange 14, 16 are under tension compared to the relaxed state shown in FIG. 1. Thereby, the flanges 14, 16 each exert a compressive force in the direction of their allocated side of the sheet. In this state, due to the axial projection of the hot melt adhesive material 24, the flanges 14, 16 abut with the hot melt adhesive material 24 on their allocated side of the sheet, wherein in each case, there is a distance between the rim of the flange 14, 16 and the surface of the sheet. Furthermore, it can be seen in FIG. 2 that an annular surrounding hollow space 32 is delimited by the outer surface 30 of the shaft body 12, the interior surfaces of the flanges 14, 16 or respectively the hot melt adhesive material 24 and the surfaces of the sheet.

If now, the auto body sheet 28, together with the device 10 inserted into the opening 26, is heated in an oven, for example, for curing a paint applied on the auto body sheet 28, the expandable hot melt adhesive material 24 is softened and expands. This leads to an adhesion of the hot melt adhesive material 24, and with it, the flanges 14, 16 to the respective surface of the sheet 28. In the still flowable state of the hot melt adhesive material 24, the sheet 28 with the device 10 is then removed from the oven, and cooling results, in particular, also of the gas enclosed in the hollow space 32. In the process, a pressure reduction results in the hollow space 32, and with it a negative pressure compared to the ambient pressure acting on the surroundings of the device 10. Due to this negative pressure, the still flowable hot melt adhesive material 24 penetrates further into the hollow space 32, and thereby, occupies a part of the original volume of the hollow space, as can be seen in FIG. 3. In the process, the hot melt adhesive material 24 penetrates so far into the hollow space 32, that the pressure loss occurring in the course of the cooling of the gas contained in the hollow space 32 is compensated due to the reduction in volume, without impairing the sealing effect of the hot melt adhesive material. In addition, in the course of heating and expansion, the hot melt adhesive material 24 emerges in the radial direction from beneath the ends of the flange 14, 16 facing the sheet 28, and forms an annular bead of hot melt adhesive material 24, in each case, on the top surface of the sheet 28 and the bottom surface of the sheet 28, as seen respectively in FIGS. 6 and 8, where a perspective view of the top (FIG. 6) and the bottom (FIG. 8) of the device 10 mounted in partially shown sheet 28 is shown. For illustration, FIGS. 7 and 9 each show the bead of hot melt adhesive material 24 in partial view. The radial emergence of the hot melt adhesive material 24 permits an easy visual inspection of the seal which occurs in the area of the flange ends during the course of heating the hot melt adhesive material 24.

A further design is explained with reference to the FIGS. 5 and 10. As can be seen in the figures, in the example shown, the second flange 16 has a through hole 34 which in the example has an oval cross section. As seen in FIG. 10, the through hole 34 in the un-mounted state is completely closed by the hot melt adhesive material 24 moulded onto the second flange 16. This complete seal of the hole 34 by the hot melt adhesive material 24 can be visually inspected from the outside in a simple manner. If the through hole 34 is completely closed, a correct application of the hot melt adhesive material 24 exists on the interior surface of the second flange 16. In the completely fabricated state of the device, the through hole 34 displays the proper seal of the component opening. A proper seal is present after the mounting and cooling procedure, only if the through hole 34 is closed by the expanding hot melt adhesive material.

The invention claimed is:

1. Device for inserting into an opening of a component of an automobile, comprising a shaft body and a surrounding flange provided on one end of the shaft body, and at least one fastening element provided on the shaft body, wherein the device is insertable into the opening in axial direction of the shaft body such that the shaft body extends through the opening and the flange abuts on a first component surface and the device is fastened to the opening by the fastening element wherein an annular surrounding hollow space is delimited between at least a surface of the shaft body, an interior surface of the flange and the first component surface, further comprising a hot melt adhesive material provided surroundingly on the flange, which hot melt adhesive material adheres sealingly on the first component surface upon heating the flange, characterized in that the hot melt adhesive material is an expanding hot melt adhesive material, which compensates for a pressure change in the hollow space caused by changing temperature through a partial expansion into the hollow space.

2. Device according to claim 1, characterized in that the holt melt adhesive material is provided on the flange projecting in the axial direction of the shaft body such that the flange abuts with the hot melt adhesive material on the first component surface when the device is inserted into the opening and the hot melt adhesive material is in a non-expanded state.

3. Device according to claim 1, characterized in that the hot melt adhesive material is not visible from the outside of the flange in the axial direction of the shaft body and upon heating expands underneath the rim of the flange radially to the outside, so that after expanding, the hot melt adhesive material is visible from the outside of the flange in the axial direction of the shaft body.

4. Device according to claim 1, characterized in that the at least one fastening element is at least one locking projection provided on the outside of the shaft body, which locking projection locks on a second component surface being opposite to the first component surface when the device is inserted into the opening.

5. Device according to claim 1, characterized in that
the device is a sealing plug for sealingly closing the opening comprising a closed cover for closing the opening and being connected with the shaft body,
the fastening element is formed by a second surrounding flange being provided on the shaft body opposite the first flange, which second flange abuts on a second component surface being opposite to the first component surface when the device is inserted into the openings, so that the annular surrounding hollow space is delimited between a surface of the shaft body, inner surfaces of the first and second flange and the first and second component surfaces, and
a hot melt adhesive material is provided also surrounding on the second flange which upon heating adheres the second flange sealingly on the second component surface.

6. Device according to claim 5, characterized in that the hot melt adhesive material is provided on the second flange projecting in the axial direction of the shaft body such that the second flange abuts with the hot melt adhesive material on the second component surface when the device is inserted into the opening and the hot melt adhesive material is in a non-expanded state.

7. Device according to claim 5, characterized in that the hot melt adhesive material is not visible from the outside of the second flange in the axial direction of the shaft body and upon heating expands underneath the rim of the second flange radially to the outside, so that after expanding the hot melt adhesive material is visible from the outside of the second flange in the axial direction of the shaft body.

8. Device according to claim 5, characterized in that the expanding hot melt adhesive material provided on the second flange also compensates for a pressure change in the hollow space caused by changing temperature through a partial expansion into the hollow space.

9. Device according to claim 1, characterized in that the expanding hot melt adhesive material has an expansion factor of at least 10%.

10. Device according to claim 1, characterized in that the first and/or the second flange are resiliently elastic at least in the axial direction of the shaft body.

11. Device according to claim 1, characterized in that, when the device is inserted into the opening, the first and/or the second flange curve in the direction of the component surface being allocated to them respectively, starting from the shaft body.

12. Device according to claim 1, characterized in that the device consists of a plastic material being produced in an injection moulding process.

13. Device according to claim 12, characterized in that the expanding hot melt adhesive material is moulded onto the first and/or the second flange in an injection moulding process.

14. Device according to claim 1, characterized in that the expanding hot melt adhesive material is mechanically connected to the first and/or the second flange.

15. Device according to claim 1, characterized in that the first flange and/or the fastening element and/or the second flange comprise a through hole.

16. Device according to claim 15, characterized in that the through hole has an oval cross section.

17. Device according to claim 1 in a state being inserted into the opening of a component of an automobile.

18. Device according to claim 1 in a state being inserted into the opening of a sheet of an automobile.

19. A device, comprising:
a body configured to be inserted into an opening of a component of an automobile, including:
   a shaft body;
   a flange surrounding the shaft body and provided on one end of the shaft body;
   at least one fastening element provided on the shaft body; and
   a cover, wherein the shaft body encircles the cover;
a hot melt adhesive material provided surroundingly on the flange, which hot melt adhesive material adheres sealingly on a first component surface upon heating the flange, the hot melt adhesive material is an expanding hot melt adhesive material, which compensates for a pressure change in an annular surrounding hollow space caused by changing temperature through a partial expansion into the hollow space, wherein
the device is insertable into the opening in axial direction of the shaft body such that the shaft body extends through the opening and the flange abuts on the first component surface and the device is fastened to the opening by the fastening element wherein the annular surrounding hollow space is delimited between at least a surface of the shaft body, an interior surface of the flange and the first component surface.

20. The device of claim 19, wherein:
the shaft body, the flange, the at least one fastening element and the cover are part of a monolithic body.

21. The device of 19, wherein:
the adhesive is configured to increase volumetrically upon heating.

* * * * *